United States Patent
Eichstaedt et al.

(10) Patent No.: US 7,765,228 B2
(45) Date of Patent: *Jul. 27, 2010

(54) METHOD AND SYSTEM FOR DATA COLLECTION FOR ALERT DELIVERY

(75) Inventors: Matthias Eichstaedt, Sunnyvale, CA (US); Thyagarajapuram S. Ramakrishnan, Saratoga, CA (US); Patrick Loo, Fremont, CA (US); Jayachandran Ravichandran Menon, Cupertino, CA (US); Sotiris Matzanas, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 447 days.

This patent is subject to a terminal disclaimer.

(21) Appl. No.: 11/961,953

(22) Filed: Dec. 20, 2007

(65) Prior Publication Data
US 2008/0098014 A1 Apr. 24, 2008

Related U.S. Application Data

(63) Continuation of application No. 10/866,065, filed on Jun. 11, 2004, now Pat. No. 7,334,001.

(60) Provisional application No. 60/478,401, filed on Jun. 13, 2003.

(51) Int. Cl.
*G06F 17/30* (2006.01)
*G06F 7/00* (2006.01)
(52) U.S. Cl. .................. 707/769; 707/783; 707/694
(58) Field of Classification Search .................. None
See application file for complete search history.

(56) References Cited

U.S. PATENT DOCUMENTS 4,922,491 A 5/1990 Coale (Continued)

FOREIGN PATENT DOCUMENTS

KR 20010040272 5/2001

(Continued)

OTHER PUBLICATIONS

Oracle7™ Server Distributed Systems, vol. II: Replicated Data, Release 7.3, Feb. 1996, Oracle®.*

(Continued)

*Primary Examiner*—Kuen S Lu
(74) *Attorney, Agent, or Firm*—Frommer Lawrence & Haug LLP; Scott M. Tobias

(57) ABSTRACT

Managing data collection for one or more scheduled alert messages. A primary or backup poller manager coordinates any number of poller services to access content and generate the alert messages. At a predefined period the poller manager is informed that an existing or new poller service is available for work. The poller manager provides a query to the poller service to access content in which one or more users have expressed an interest. Querying for a large number of users can be subdivided among the poller services. The poller service can also automatically expand the query if it yields insufficient content. The poller service generates the alert messages for the interested users and informs the poller manager when done. A change in content can be used to generate or update alert messages before their scheduled delivery. The poller manager prioritizes processing with a quality of service level.

25 Claims, 7 Drawing Sheets

U.S. PATENT DOCUMENTS

| | | | |
|---|---|---|---|
| 5,454,074 A | 9/1995 | Hartel et al. | |
| 5,758,088 A | 5/1998 | Bezaire et al. | |
| 5,901,327 A | 5/1999 | Ofek | |
| 6,021,433 A | 2/2000 | Payne et al. | |
| 6,167,426 A | 12/2000 | Payne et al. | |
| 6,332,141 B2 | 12/2001 | Gonzalez et al. | |
| 6,425,006 B1 | 7/2002 | Chari et al. | |
| 6,449,356 B1* | 9/2002 | Dezonno | 379/265.01 |
| 6,553,416 B1 | 4/2003 | Chari et al. | |
| 6,694,337 B1* | 2/2004 | King et al. | 707/201 |
| 6,704,874 B1 | 3/2004 | Porras et al. | |
| 6,718,332 B1 | 4/2004 | Sitarman et al. | |
| 6,735,614 B1 | 5/2004 | Payne et al. | |
| 6,753,784 B1 | 6/2004 | Sznaider et al. | |
| 6,993,774 B1* | 1/2006 | Glass | 719/330 |
| 7,007,070 B1* | 2/2006 | Hickman | 709/208 |
| 7,054,910 B1* | 5/2006 | Nordin et al. | 709/208 |
| 7,096,498 B2 | 8/2006 | Judge | |
| 7,143,118 B2 | 11/2006 | Eichstaedt et al. | |
| 2001/0036224 A1 | 11/2001 | Demello et al. | |
| 2002/0004705 A1 | 1/2002 | Baron et al. | |
| 2002/0040282 A1 | 4/2002 | Bailey et al. | |
| 2002/0065884 A1* | 5/2002 | Donoho et al. | 709/204 |
| 2002/0080948 A1 | 6/2002 | Canali et al. | |
| 2002/0091832 A1 | 7/2002 | Low et al. | |
| 2002/0198946 A1 | 12/2002 | Wang et al. | |
| 2003/0032409 A1 | 2/2003 | Hutcheson et al. | |
| 2003/0033179 A1 | 2/2003 | Katz et al. | |
| 2003/0069923 A1* | 4/2003 | Peart | 709/203 |
| 2003/0078858 A1* | 4/2003 | Angelopoulos et al. | 705/26 |
| 2003/0110262 A1 | 6/2003 | Hasan et al. | |
| 2003/0135464 A1 | 7/2003 | Mourad et al. | |
| 2004/0038664 A1 | 2/2004 | Stoks | |
| 2004/0044774 A1 | 3/2004 | Mangalik et al. | |
| 2004/0078340 A1 | 4/2004 | Evans | |
| 2004/0098370 A1* | 5/2004 | Garland et al. | 707/1 |
| 2004/0098390 A1* | 5/2004 | Bayliss et al. | 707/7 |
| 2004/0133794 A1 | 7/2004 | Kocher et al. | |
| 2004/0143644 A1* | 7/2004 | Berton et al. | 709/217 |
| 2004/0143667 A1 | 7/2004 | Jerome | |
| 2004/0204988 A1* | 10/2004 | Willers et al. | 705/14 |
| 2004/0224769 A1 | 11/2004 | Hansen et al. | |
| 2005/0027676 A1 | 2/2005 | Eichstaedt et al. | |
| 2005/0027741 A1 | 2/2005 | Eichstaedt et al. | |

FOREIGN PATENT DOCUMENTS

| | | |
|---|---|---|
| KR | 20020007833 | 1/2002 |
| KR | 20020016258 | 3/2002 |
| KR | 20020084435 A | 11/2002 |
| WO | 0017789 A1 | 3/2000 |

OTHER PUBLICATIONS

International Search Report for PCT/US04/18541, mailed Nov. 26, 2004.
International Search Report for PCT/US04/18542, mailed Nov. 29, 2004.
Oraclea Alert User's Guide, Release 11i, Oct. 2001, 225 pages.
Oraclea Applications User's Guide, Release 11i, Oct. 2001, 286 pgs.
Sumiya, K. et al. "Models and Systems for Information Broadcast." Journal of Information Processing Society of Japan. vol. 40, p. 141-157 (Nov. 15, 1999).
Miyazaki, S. et al. "WebSCAN: Content-Based Change Discovery and Broadcast-Notification for Web Sites." Journal of Information Processing Society of Japan. vol. 42, p. 96-107 (Jul. 15, 2009).
Pawlak, P. "SQL Server 2000 Add-On to Add Notification Service to Application is Released in this Summer." Directions on Microsoft, Mediaselect Inc.. vol. 8, p. 21-26 (Jul. 15, 2002).

* cited by examiner

METHOD AND SYSTEM FOR DATA COLLECTION FOR ALERT DELIVERY

CROSS-REFERENCE TO RELATED APPLICATIONS

This is a Continuation application and claims priority under 35 U.S.C. 120 to U.S. patent application Ser. No. 10/866,065, filed Jun. 11, 2004, which claims priority to U.S. Provisional Application No. 60/478,401, filed Jun. 13, 2003, the entire contents of both of which are hereby incorporated by reference.

FIELD OF THE INVENTION

The present invention is generally directed to messaging, and more particularly, to managing data collection for alerts over a network.

BACKGROUND OF THE INVENTION

Some services have provided users with alerts of specialized content such as stock quotes. These alert services generally provide content on a single topic to users registered with a specific service. To obtain alerts on multiple topics, a user typically registers with multiple services.

DETAILED DESCRIPTION OF THE INVENTION

Figure 1:
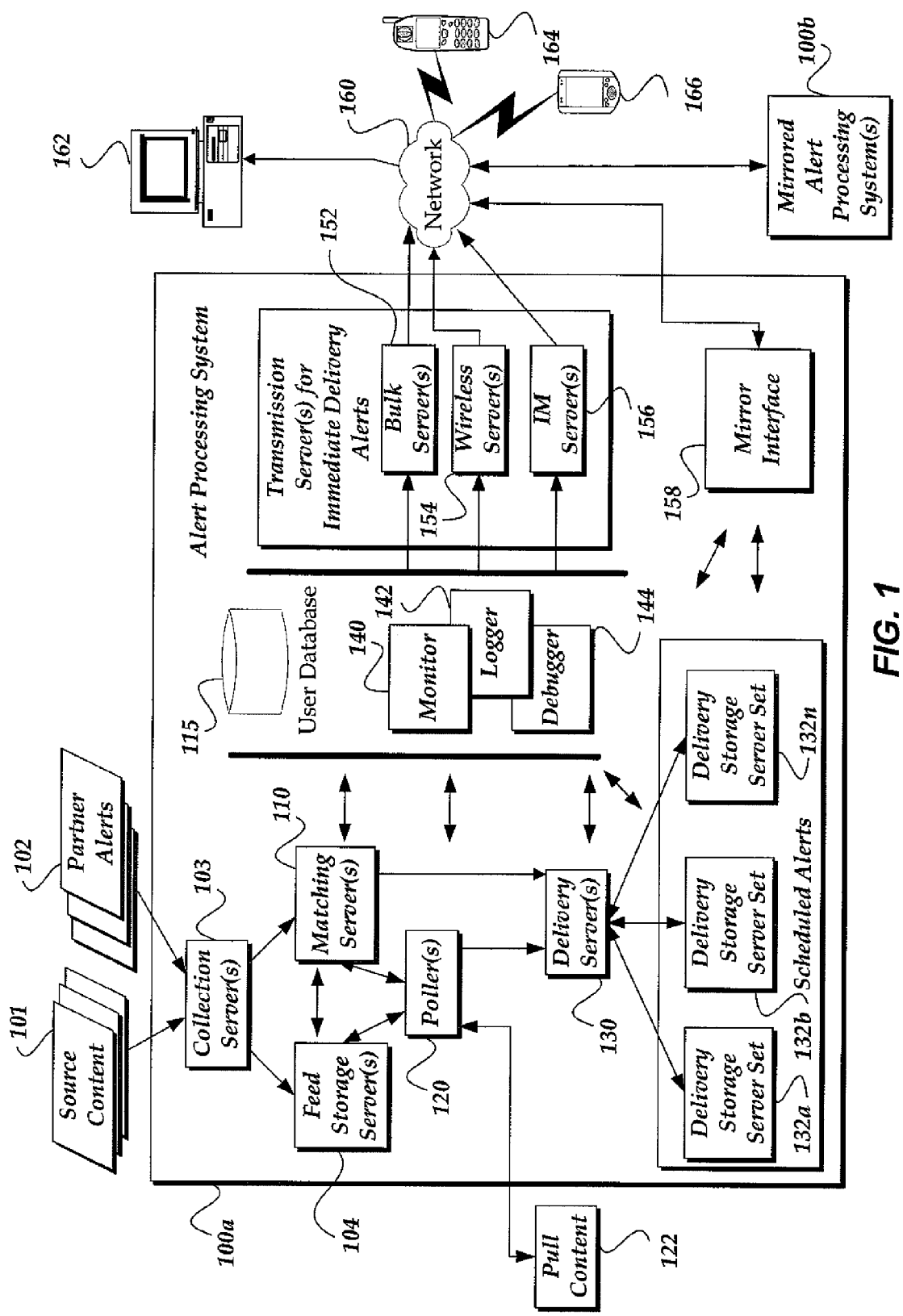
FIG. 1 illustrates an exemplary alert architecture in accordance with the present invention.

The present invention now will be described more fully hereinafter "with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled," means a direct connection between the things that are connected, or an indirect connection through one or more either passive or active intermediary devices or components. The meaning of "a," "an," and "the" include plural references. The meaning of "in" includes "in" and "on."

Briefly stated, the invention is direct to a system and method for enabling a user to register an interest and subsequently provide a notification (an alert) to the user when new information becomes available regarding the registered interest. There are several types of content that could be of interest to a user, including, but not limited to, stock feeds, news articles, personal advertisements, shopping list prices, images, search results, and the like. Also, alerts can be provided to the user with any, or all, of a variety of delivery methods, including, but not limited to, instant messaging (IM), email, Short Message Service (SMS), Multimedia Message Service (MMS), voice messages, and the like.

In some cases, a user could select alerts for certain registered interests to be provided by all available methods and other alerts for other registered interests to be provided by only one method. Additionally, some alerts may be provided with a push method to provide relatively immediate notification. In this case, the invention would employ stored contact information to deliver the alert to the user with all selected delivery methods. In contrast, other alerts can be provided with a pull method that replies with the alerts in response to requests from a user regarding other registered interests. The requests can also be scheduled predefined times to provide periodic alerts.

For users that communicate with the invention from behind some Network Address Translation (NAT) device on a network, the pull method employs the connection established by the user's pull request to send the alert to the user. How often the pull alerts are provided is determined by the frequency with which a user makes a pull request of the invention. However, for other users that are not communicating with the invention through a NAT, the push method can be employed at selected time intervals to provide less than urgent alerts.

History of alerts can be provided on a web page for a user. Also, queries for processing alerts for substantially the same registered interests can be combined to enable scaling of the invention to relatively large numbers of users. To further enable scalability, boolean pre-processing and pre-indexing of queries can be applied to new content information for registered interests as the new content information becomes available, such as through an extensible markup language (XML) feed. User profiles can also be provided that include various information, including, but not limited to, Boolean queries for registered interests, delivery methods, time schedules, and the like.

FIG. 1 illustrates an exemplary alert architecture in accordance with the present invention. The alert architecture can be implemented with one or more software modules and/or one or more computing devices such as servers, client devices, and the like. The computing devices generally include a processor, a memory, a communication interface, and input/output interface, a storage device, and/or other conventional computing components. An alert processing system 100a accesses source content 101, partner alerts 102, pull content 122, and/or other content information for distribution as alerts to client devices. Source content 101 can comprise a variety of content such as personal advertisements, shopping prices, news articles, and the like. Partner alerts 102 further comprise content such as stock quotes, auction bids, and the like that may already be provided as an alert from a topical service. Source content 101 and/or partner alerts 102 can be pushed and/or pulled content. In other words, source content 101 and/or partner alerts 102 can be event based feeds of content and/or scheduled time based feeds of content. One or more feed collection servers 103 receive content and perform input processing as described in further detail with regard to FIGS. 2 and 3. For content that is not immediate processed, collection servers 103 send the content to storage servers 104.

One or more matching servers 110 associate content with users who have indicated an interest in receiving alerts about selected content. Generally, matching servers 110 are employed when a content source pushes in content, which is not already associated with a user request. An interest in receiving one or more types of alerts is indicated in user profiles, which are stored in a user database 115. The user profiles include user identifiers, desired alert types, desired delivery method, and other information. A poller 120 manages requests for content on behalf of users. Generally, poller 120 initiates access to content from content sources. Poller 120 can access some independent pull content 122 from content sources that do not push content to collection servers 103.

One or more delivery servers 130 are in communication with matching servers 110 and poller 120. Delivery servers 130 access pull content 122 from poller 120, pushed content from matching servers 110, and user information from user database 115. Delivery servers 130 prioritize and manage distribution of alerts for immediate and pre-scheduled delivery. Pre-scheduled alerts are stored on one or more storage server sets 132a-132n. Each set can correspond to a type of alert, a delivery method, and/or other characteristics. As alerts are prepared and delivered, a user monitor 140 watches the flow of alerts for patterns and/or other insights. Monitor 140 can also track and/or access information about user behaviors, such as navigating to Web sites, making online purchases, and the like. The tracked behaviors also indicate user interests which are stored in user profiles in user database 115. A logger 142 tracks data associated with individual users, alert types, and other parameters. A debugger 144 is used to trouble shoot problems with processing alerts. When an alert is to be delivered, it is routed to one or more appropriate servers for delivery by the user's preferred method(s). For example, email alerts can be delivered via bulk servers 152. Alerts to wireless mobile devices can be delivered via wireless servers 154. Instant message alerts can be delivered via instant message servers 156. Each alert is generally communicated over a network 160 to a client device identified in the user profile. The user can indicates that the alert be delivered to one or more of a personal computer (PC) 162, a mobile terminal 164, a hand-held computer 166, and/or the like.

A mirror interface 158 can also be used to communicate with one or more mirrored alert processing systems 100b. All, or portions of the data and processing operations introduced above can be reproduced for parallel processing in the same and/or different locations. Mirror interface 158 can comprise a central communication interface and/or be distributed within each of the servers discussed above, so that each server type can communicate with mirrored server types. At each mirrored alert processing system, the operations of each server type can be customized for locally unique factors.

Figure 2:
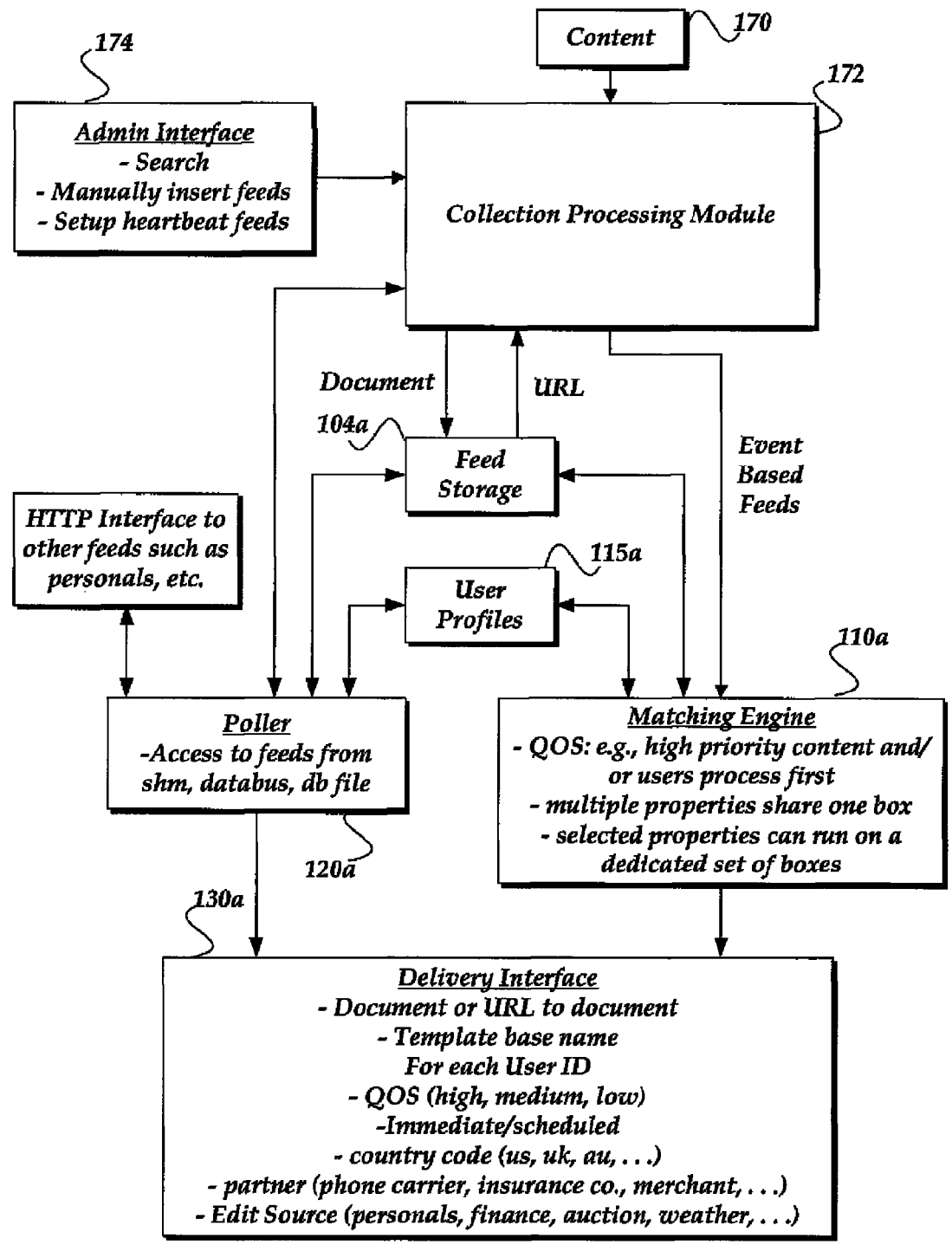
FIG. 2 is a functional block diagram illustrating relationships and data flows among functional elements corresponding to the architecture described with regard to FIG. 1.

FIG. 2 is a functional block diagram illustrating relationships and data flows among functional elements corresponding to the architecture described with regard to FIG. 1. Pushed or pulled source content 170 is receive in one or more forms, including as a hypertext markup language (HTML) document, as an XML document, as a text file, as an email message, as an instant message, and the like. As needed, a collection processing module 172 performs one or more pre-processing operations on the received content to normalize the various forms of content that are received. Normalized content documents are generally indexed by source, time-stamp, content type, and/or other characteristics for easy storage and retrieval in a feed storage 104a, which also assigns a universal resource locator (URL) based on the storage directory path. The URL is made available to collection processing module 172 for later retrieval. Collection processing is described in further detail with regard to FIG. 3.

An administration interface 174 is available to access the received data for review and/or administrative functions such as obtaining a status, searching, manually inputting content, and the like. Administrative interface 174 can also be used to set up heartbeat feeds of test content that are tracked to ensure the system is operating properly.

If the content was pushed in from an event based feed, such as a stock price source, the content is relayed to a matching engine 110a. This relay and/or other communications, such as a time based feed, can be performed via a replicate feed that enables data to be copied from one server to another server. Alternatively, the relay and/or other communications can be performed via a databus feed that enables data to be broadcast until received by all intended recipients. The matching engine determines the users to which an alert should be sent about the received content. The matching engine accesses user profile data 115a from the user database to associate the content with users who have indicated a desire, or otherwise selected to receive an alert about the content. In particular, a user profile indicates one or more content types for which the user desires an alert, such as traffic incidents, stock quotes, and the like. The user's profile also indicates one or more Boolean queries comprising one or more logical operators, such as AND, OR, NOT, and the like. A sample Boolean query in a user profile is illustrated as:

STOCK AND (COMPANY AND PRICE>$100)

If incoming content type comprises a stock quote, matching engine 110a applies the Boolean query to determine whether the stock quote content includes information about the selected company and a price greater than $100. If the stock quote does include matching content, matching engine 110a adds the user to a list of users who desire an alert about the matching content.

Many other users can have a similar query, and/or match the incoming content with different queries. To improve performance for scalability, matching engine 110a maintains an index of queries and associates each query to those users who desire the same, or very similar, query results. The index of queries reduces duplication of query operations. Future incoming content can be resolved against these pre-indexed queries. For any queries that result in a match, the corresponding user identifier is added to the list. Also taken from the user's profile and included in the list is the user's desired method of delivery such as by email, by instant message, by cellular phone, and the like. Similarly, a desired time for delivery can be specified in the user profile. A message limit can also be provided in the user profile to limit the number of alerts and/or other messages that are sent to the user. The queries can be distributed among computing devices based on the type of content, the current load on the computing devices, and/or other properties. When all queries have been performed for the content, matching engine 110a prepares to relay the content and list to a delivery interface 130a.

Prior to relay, matching engine 110a can also determine priorities based on the user profile data, the type of content, the type(s) of alerts to be sent, and the like. A priority is sometimes referred to as a quality of service (QOS) level. For example, stock price content is typically very time sensitive, so the matching engine can apply a higher priority (e.g., high QOS level) on matching stock price content to users. As another example, the matching engine can use user profile data 115a to prioritize outgoing alerts to users according to paid service plans and/or other characteristics.

For pulled content using a scheduled time based feed, a poller 120a requests content for one or more users who desire an alert on an indicated content type. Poller 120a can pull content from collection processing module 172 or directly from external sources that may not be pre-arranged to feed content to collection processing module 172. External content is normalized and otherwise pre-processed in the manner described above, unless the requested content is pre-processed by the content sourced prior to be sent to poller 120a. Further detail regarding the poller processes is described below with regard to FIGS. 4 and 5.

In any case, when content is to be delivered to an end user, a delivery interface 130a shown in FIG. 2 generates alerts in one or more methods desired by users. For example, some users may desire alerts delivered as short message service (SMS) messages to a cellular phone number. Delivery interface 130a generally uses a template corresponding to the delivery method. The template is applied to a content document or a URL to the content document to generate the final alert. Delivery interface 130a also manages the timing and/or other QOS aspects of alert delivery for each user. For example, some alerts are delivered immediately, while other alerts can be scheduled for later delivery. Other examples include arranging for routing based on geographic location, business partners, content sources, and/or other parameters. Delivery interface 130a also manages undeliverable alerts, and/or other maintenance issues. Further detail regarding delivery is discussed below with regard to FIG. 6.

Content Data Collection Processing

Figure 3:
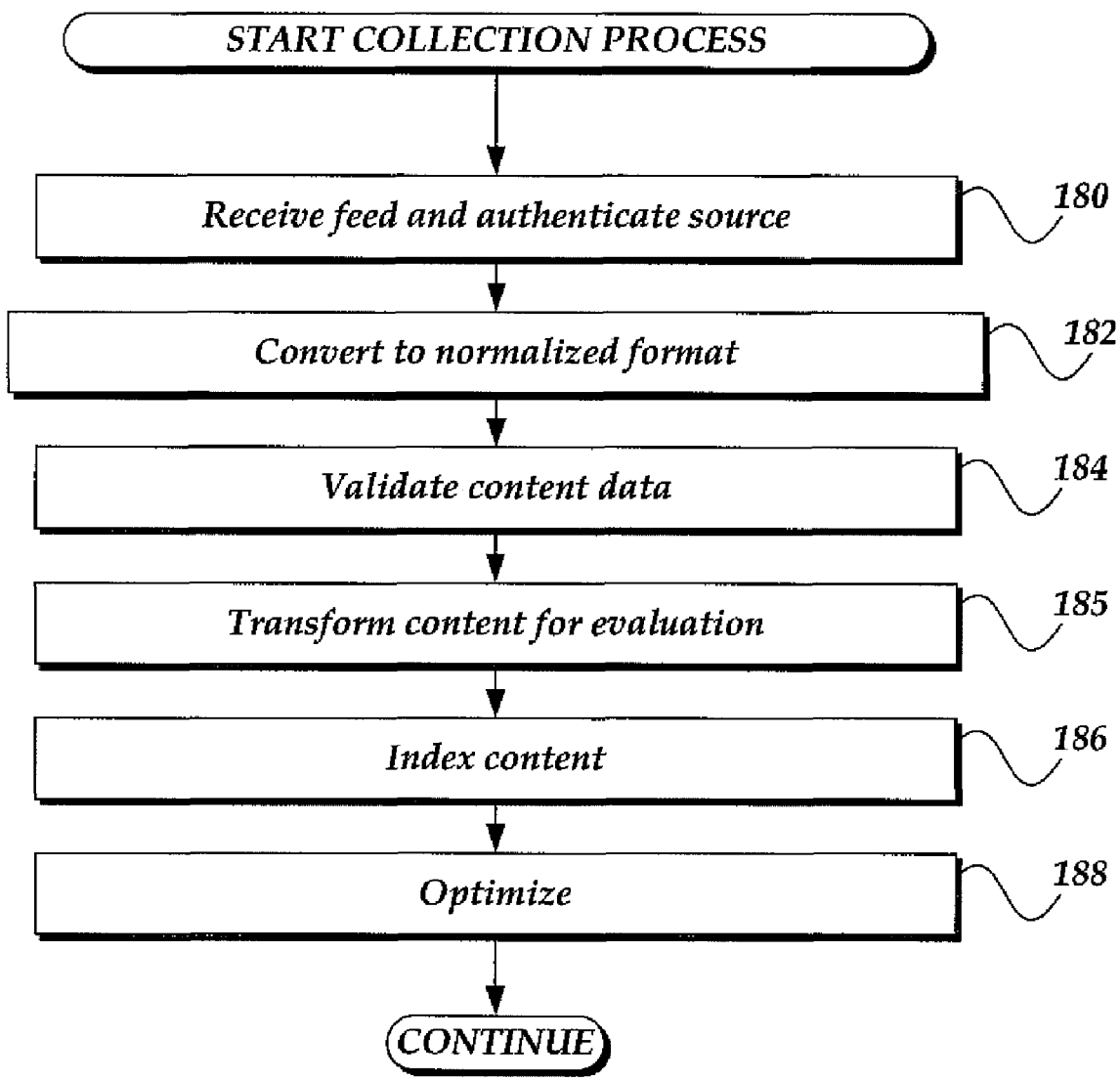
FIG. 3 is a flow diagram illustrating exemplary logic for processing collected content.

Further detail is not described regarding content collection processing. FIG. 3 is a flow diagram illustrating exemplary logic for processing collected content. When content is received, the source is authenticated at an operation 180. Authentication and/or other security measures can be implemented in one or more ways, including via digital certificates, digital signatures, encryption, virtual private network tunnels, and the like. The source for the content can also be authenticated with domain security mechanisms, including, but not limited to, a domain key application such as provided by Yahoo!, Inc.

At an operation 182, the received content is converted to a normalize content format, such as an XML format. Table 1 illustrates a sample XML data structure to which received content is normalized for further processing and eventual delivery as an alert.

TABLE 1

Sample XML Data Structure

| | |
|---|---|
| Contact | An email address where parse error and data inconsistency can be reported |
| Country | The country code of the feed |
| Date | The date of the document |
| ExpirationDate | The expiration date of the content |
| Url | The url |
| ArchiveUrl | The url for the alerts feed archive |
| FeedProvider | The name of the feed provider (Reuters, AP) The feed providers need to be verified from a config file. |
| Type | The type of feed. This field works in conjunction with the edit pages. The edit page saves each alert with a specific type. Each alert type is a string, for example finance/ quotes/real-time/personals. |

TABLE 1-continued

Sample XML Data Structure

| | |
|---|---|
| Title | The title of the document. |
| Alert_Data | The children of this tag can contain any additional data and tags that is needed for the email formatting. Each child tag will be available to the email formatting system as key-value pair. |

The following code illustrates a sample normalized XML content document regarding a traffic incident that can be used to generate an alert.

```
<?xml version="1.0" encoding="UTF-8"?>
<AlertsDocument>
<Contact>shi@yahoo-inc.com</Contact>
<Country>US</Country>
<Date>1048495620000</Date>
<ExpirationDate>1048497420000</ExpirationDate>
<Url>http://alerts.yahoo.com/</Url>
<Feed>us_traffic</Feed>
<Type>traffic</Type>
<Title matching=1>
Disabled vehicle
</Title>
<Abstract matching=1>
Disabled Vehicle
</Abstract>
<Body>
Some more descriptive about the incident.
</Body>
<Alert Data>
< DESC>Disabled Vehicle</ DESC>
< LATITUDE>38.554289</ LATITUDE>
< LONGITUDE>-121.406181</ LONGITUDE>
< SEVERITY>2</ SEVERITY>
< STATE>CA</ STATE>
< MARKETCODE>SAC</ MARKETCODE>
< ENDTIME>Mon Mar 24 09:17:00 2003</ ENDTIME>
< ITISCODE>211</ ITISCODE>
<ITISMESSAGE> Some more descriptive about the
incident.</ITISMESSAGE>
...
</AlertData>
</AlertsDocument>
```

At an operation 184, the collection processing module validates the content to verify that necessary data was included from the source. Validation can also include updating and/or removing duplicate content that was previously received, and/or ensuring other data integrity aspects. Additionally, validation can include verifying the content as received correctly from the authenticated source. The verification can include validation of encryption/decryption, digital signatures, digital certificates, passwords, symmetric key pairs, asymmetric key pairs, and the like.

Typically, a normalized XML content document can be processed without further modification. However, some modifications can be applied to during a feed transformation operation 185. In many cases, content feed transformation would comprise minor formatting conversions or simple string substitutions to address validation problems. Nevertheless, more complex logical operations can be performed. For example, an incoming stock quote can be compared to a previous stock quote to determine whether a predefined percentage change has occurred in the stock price. There may be a large number of users who requested an alert when the price of a certain stock changed by a certain percentage since a day's market opening. The collection processing module can pre-calculate a current percentage change prior to associating the stock quote data with users, so that processing resources need not be used or duplicated in determining whether an alert should be sent to the large number of users.

At an operation 186, the collection processing module also indexes the content to store, search, retrieve, track, and/or organize the content based on a number of metrics. Some of the metrics are inherent in the normalized data structure of the normalized content document, however, the metrics can also be stored in an index document for status information and reports. Example metrics can include the time at which the content was received, an identifier of the sender, a country from which the content was sent, a type of the content, whether the content is associated with a poll request, whether the content is associated with previously received content, and the like. In addition to easing access to a large amount of incoming content, the collection processing module can use the metrics to perform housekeeping and optimization, such as deleting duplicate content, filtering the content to identify minor revisions, and the like, at an operation 188. For instance, a spelling error may be corrected in a news article, and resent from a content source. A user is unlikely to want two alerts of the same news article with only the spelling correction. If the first news article was already sent, then the second version can be deleted unless difference threshold is exceeded. Alternatively, if the news article was not already sent as an alert, the first version of the news article can be replaced with the corrected version, and queued up so that only one alert is sent to users at a scheduled time. The index document of metrics and/or the content document are generally stored in the feed storage. Each stored index document is identified by an index universal resource locator (URL) for easy access to the index information.

Throughout the above operations, the collection processing module can insert tags and/or other code to assist the matching engine. For example, with regard to the sample XML document described above, the collection processing module can apply an optional 'matching' attribute to each immediate CDATA child of the <AlertsDocument> tag. The matching engine can scan the document for 'matching' tags and apply the query expression(s) to the text element to determine the user identifiers that match the document.

Poller Subsystem

Figure 4:
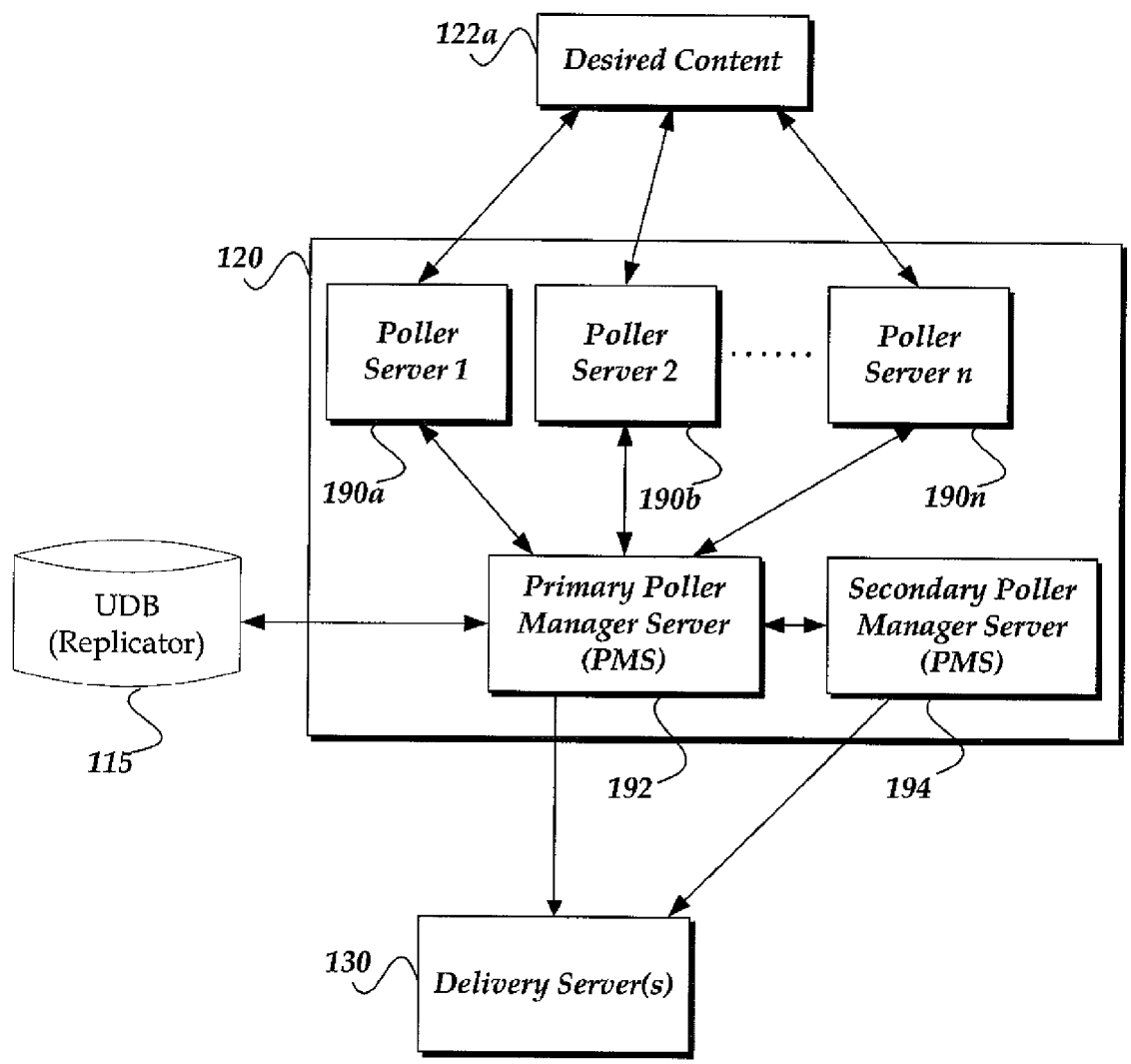
FIG. 4 illustrates a poller architecture for managing polled content to produce scheduled alerts.

FIG. 4 illustrates a poller architecture for managing polled content to produce scheduled alerts. There are N numbers of poller servers 190a through 190n, and at least two poller manager servers (PMSs), including a primary PMS 192 and a secondary PMS 194, which generally acts as a backup. Each poller server runs a number of processes that uses non-blocking F/O to handle a number of polls from one or more desired content sources 122a based on the alert type, such as a personal advertisement, a weather notice, and the like. The desired content could be communicated to poller 120 from the collection processing module and/or accessed independently, such as through an HTTP interface. Each poller server stores identical alerts information per user identifier in database files such as 96 Berkeley DB files. Each file represents a time slot such as 15 minutes—24×4. When an alert request is inserted into the user's profile in user database 115, a QOS value is calculated based on a provider code, alert type, premium flag, and/or the like. A scheduled alert is communicated to delivery server(s) 130 for distribution at a corresponding period.

Figure 5:
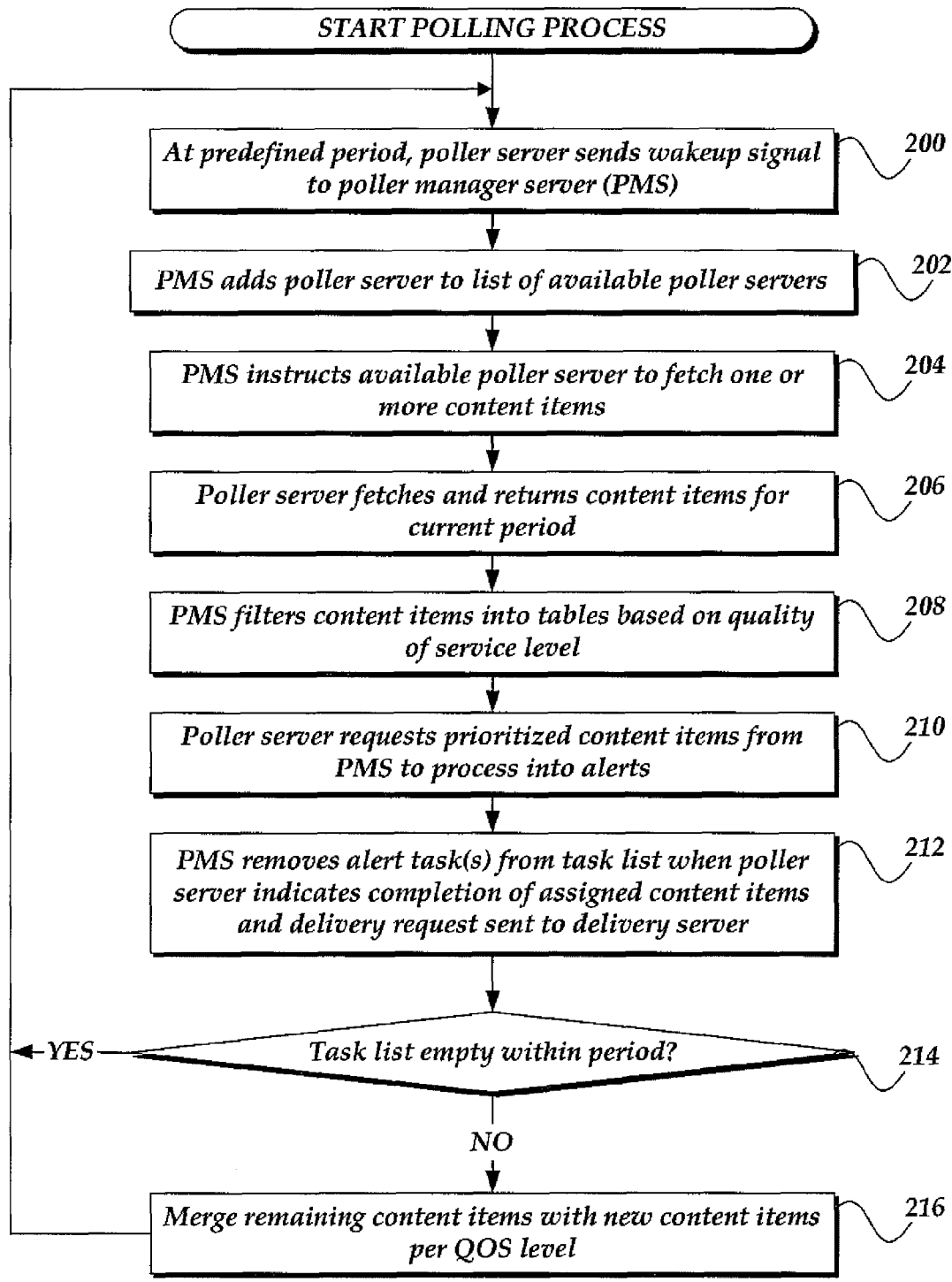
FIG. 5 is a flow diagram illustrating logic for preparing a time based alert.

FIG. 5 is a flow diagram illustrating logic for preparing a time based alert. At an operation 200, a poller server wakes up after a predefined period elapses and sends a wakeup signal to the primary PMS. If the primary PMS is down, the wakeup signal is routed to the secondary PMS. The wakeup signal indicates that the poller server is available to poll for content corresponding to one or more predefined alert types. Wakeup signals can be throttled so that the PMS is not overrun with wakeup signals all at once. When the PMS receives a wakeup signal, the PMS adds the currently available poller server to a poller server list in the PMS' memory at an operation 202. At an operation 204, the PMS sends a fetch_alerts_list request to have the first poller server on the PMS's list access one or more content items, such as personal advertisements, traffic reports, and the like. At an operation 206, the poller server receives the fetch request, accesses the desired content item(s), and sends the content item(s) back to the PMS. To access the content item(s), the poller server performs a query defined by stored user preferences and/or a consolidated query that is desired by numerous users. If no results are found from a query, the poller server can optionally broaden the query and try again. The content item(s) correspond the current predefined period, such as a 15 minute slot. The poller server can prioritize the content item(s) according to QOS levels before returning them to the PMS.

The PMS filters the returned content items from the number of poller servers into tables at an operation 208. The tables are based on QOS levels of alert types, user service plans, and the like. For example, the content items can be sorted into QOS table 3, QOS table 2, QOS table 1 and QOS table 0 corresponding to priority levels. Each content item would also have a timestamp assigned when the content item is added into one of the tables. The timestamp enables the PMS to track the length of time that the content item has been in a table without being processed into an alert. In general, a content item that stays in a table beyond a threshold length time, indicates that there are not enough poller servers for the load.

In addition to polling for content items at predefined intervals, the polling servers perform operations to prepare corresponding alerts to be delivered. Thus, at an operation 210, the poller servers send requests to the PMS to ask for work. The PMS generally sends content items from the tables to the poller servers based on the order of QOS levels. The poller servers can perform logical operations such as comparing old query results to the current content item(s). For example, if a current content item is different from an old query result, the poller server can replace the old query result with the current content item. Since scheduled alerts may not be delivered for a long period, the content may be updated a number of times before a corresponding alert is ultimately delivered. Once a poller server finishes its work, the poller server sends an acknowledgment to the PMS, indicating that the content item has been processed and an alert has been created. The poller server also sends a request to the delivery server to deliver an alert with the content item, and the poller server asks for more work. Upon receiving the acknowledgement, the PMS removes the content item from its corresponding table, at an operation 212, indicating that the corresponding alert task is complete.

At a decision operation 214, the PMS determines whether all content items from each table were removed, indicating that all tasks for each QOS level were completed. If each table is empty, processing returns directly to operation 200 to await another wakeup signal. If each table is not empty, the PMS was not able to complete all of its tasks, and the PMS may log an error. Any remaining unprocessed content items are merged, at an operation 216, with any new content items that are obtained during the next period.

Delivery Subsystem

Figure 6:
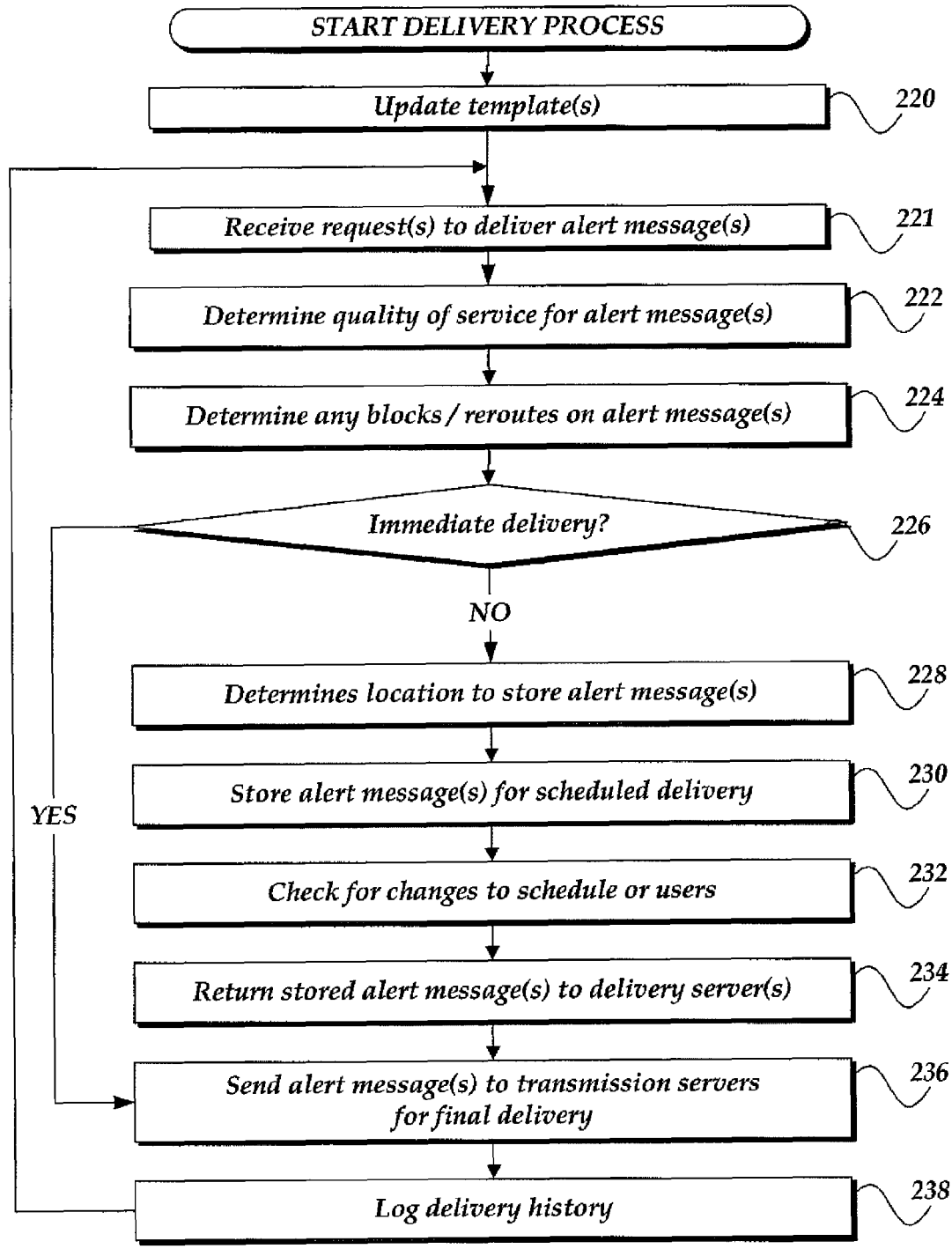
FIG. 6 is a flow diagram illustrating exemplary logic for delivering an alert to one or more users.

FIG. 6 is a flow diagram illustrating exemplary logic for delivering an alert to one or more users. As briefly discussed above, the delivery servers and storage servers generally comprise a delivery subsystem for interfacing with transmission servers to deliver alerts in a variety of methods. All components of the delivery subsystem can comprise any combination of hardware and/or software configurations. This flexibility enables deployment of alerts in varying circumstances, such as on international sites with limited hardware resources.

At an initialization operation 220, such as when a delivery server is newly installed or returned to service after being offline for some time, and/or at a certain predefined periods, the delivery servers receive updated templates from another live delivery server and/or from another source such as the administrative interface. All delivery servers should have the same set of templates automatically propagated throughout the delivery servers set.

At an operation 221, the delivery server(s) receive one or more requests from the matching engine and/or the poller to deliver one or more messages to one or more users. The requests generally include a set of keys and values associated with each key. The keys correspond to placeholders in delivery templates that correspond to delivery method, such as email, instant messenger, SMS, Web server, file transfer protocol (FTP) delivery, and the like. For example, a key-value pair of <fullname, John Smith> in a request will be used to replace a 'fullname' placeholder in a selected delivery template. The delivery templates can be written in well known template languages such as personal home page hypertext processing (PHP), JAVA™ server pages (JSP), HTML Force 2000 (HF2K), and/or a proprietary template language. The content type, such as stock quotes, news, classifieds, and the like, can be used by the delivery server to determine which set of delivery templates to use. For each content type, a set of delivery templates can be created for the different available delivery mechanisms such as HTML page server, text file transfer, Instant Messenger, SMS, and the like. However, the delivery servers generally do not have any knowledge of a specific alert document to be processed. Instead, the delivery servers simply see a document comprising the content and the user ID list. This combination of content document and user ID list is sometimes referred to as a ProcessMatchList. As described above, the user ID list comprises those user IDs that matched a specific content feed. The content document comprises a set of key-value pairs that represent the actual content of the alert to be sent. There can be a set of key-value pairs for each delivery method, including, but not limited to, one pair for email delivery, one pair for wireless delivery, one pair for IM, and one pair for web history, which is explained below. In addition to the key-value pairs identified in Table 1 above, the ProcessMatchList also generally includes the following information from a user's profile for delivery purposes:

User ID code from user database;
Country code for delivery;
Partner ID associated with the alert content and/or delivery method;
A User category;
QOS level;
Scheduled versus immediate delivery flag;
Premium service package information;
Pass through billing information that may be need such as for mobile delivery.

The information above can also be used for logging/statistical purposes, to determine the actual template used to format the alert content, for any billing activity on the last leg of the delivery path through mobile service providers, email providers, and the like.

Upon receipt of a ProcessMatchList, the delivery servers determine, at an operation 222, the QOS level associated with each user and/or delivery method identified in the ProcessMatchList. The delivery server will process requests in accordance with QOS levels in both inbound and outbound queues. A message from the match servers generally ends up in the appropriate inbound queue according to the priority level of the users that the queue contains. An alert generated from the delivery server generally ends up in the appropriate outbound queue according to whether the alert is to be send via email, wireless SMS, IM, and/or the like. In addition, or alternatively, the delivery servers can ensure that premium users will have special delivery options if, for example, the user database is down. The storage servers store a last known email address, wireless device number, and/or the like, that is known about each user. The delivery server retrieves that information from the storage server in case the delivery server cannot get the information from the user database. The delivery server can also enforce a message limit per alert, per wireless device, per user, and/or the like. The delivery server will interface with the storage server to store/retrieve message limit information.

At an operation 224, the delivery server determines whether any kind of block or rerouting has been placed on delivery of alerts to certain users and/or through certain delivery methods. For example, a user may have indicated quiet time during which the user does not wish to receive any alerts, such as during evening hours. Similarly, a user may be on vacation, and has requested that no alerts be delivered until the user returns. The delivery server can also determine whether alerts should be forwarded through any number of delivery methods beyond the user's primarily preferred method.

At a decision operation 226, the delivery server determines which alerts are to be sent immediately and which are to be sent at a scheduled time. Those alerts that are scheduled for later delivery will be stored on the delivery storage servers. There are at least two ways to implement the delivery storage servers, referred to herein as option A and option B.

Option A:

For scheduled alerts, a resource manager server (RMS) determines, at an operation 228, which users' alerts get stored on which storage servers. Any delivery server that needs to store an alert for a user, will first lookup the user's corresponding alert settings in the user database to locate a StorageId where alerts are to be stored. If no such StorageId exists, then the delivery server contacts the RMS to get a StorageId. The RMS will decide which storage server on which the user's alerts will be stored, depending on the current load/usage of each of the registered storage servers. A serverId will be returned to the delivery server which will then store the StorageId in the alerts settings in the user database. For failover purposes, or if the RMS is down or non-responding, an RMS API will ensure that the last issued StorageId is passed as a result on any subsequent queries to the RMS, until it comes back up.

Once the appropriate storage server is identified, the delivery server stores the user's alert(s), and (optionally) their delivery options, to that storage server, at an operation 230. In addition to simply waiting for later delivery, stored alerts may be compared to newer alerts to ensure the most recent content. For example, a user should receive only one single alert for a news story that was updated multiple times in a day, although multiple matches may be generated from the updates over a period of time before the scheduled delivery time.

As with the delivery servers, the storage servers generally will have no knowledge of any alert-specific information. The storage servers will make every attempt to store information in a share memory (e.g., shm) for fast retrieval, and use disk storage as little as possible. For efficiency, any information common to a large number of users, such as content feed information, can be stored once and indexed to the users. In one embodiment, there can be at least four storage areas in each server, which can be implemented via a combination of shared memory and disk write back:

Feed storage: each collection of key-value pairs would be stored once for the whole set of users matched to the type of content feed.

User Storage: an entry for each user interested in receiving a scheduled alert. This area is needed for fast access to a user's record in case they decide to delete/edit the alert.

Time storage: each user interested in receiving a scheduled alert will have a record stored under the appropriate time slot and the appropriate service queue.

Web Storage: Every delivered alert will have a permanent record with a pointer to the feed that created it, for usage on a web front end.

For failover and faster retrieval of scheduled alerts, any of the servers can be mirrored. Each server can act on a subset of alerts, such as via a modulo algorithm. For each action, such as delivering a scheduled alert, a server will replicate the action to one or more peer mirrors. A heartbeat mechanism is generally established between processes that perform scheduled deliveries, so that if a server goes down or the process fails for some reason, the remaining processes on the mirror servers will continue doing the work. This takes advantage of the mirror servers, not only for failover, but also to multiply (e.g., double, triple, etc.) the available processing power.

Option B:

In an alternate embodiment of the delivery storage server, a relational database stores feed content relative to alert matching results. Conceptually, three types of tables are used to associate feed content, user alert matches, and delivery schedule times. Accordingly, the three types of tables are called Feed table, AlertMatches table, and TimeSlot table. The Feed table contains each content feed that is received by the storage server. Each content feed is uniquely identified by a FeedId. A sample Feed table data structure is shown in Table 2.

TABLE 2

Sample Feed Table Data Structure

| Data Field | Data Type |
| --- | --- |
| FeedId | Text |
| FeedContent | Text |
| ExpirationDate | Timestamp |
| CreationTime | Timestamp |

The AlertMatches table stores the user matches for every alert. A user's alert is referenced by a unique AlertId. For each AlertId there may be 0 or more content feeds. Several matches for one AlertId will be represented by multiple rows in the AlertMatches table, each row having a different FeedId. Each tupel <AlertId, FeedId> is unique in the AlertMatches table and ties a user's alert to the corresponding content feed. A sample AlertMatches table data structure is shown in Table 3.

TABLE 3

Sample AlertMatches Table Data Structure

| Data Field | Data Type |
| --- | --- |
| AlertId | Text |
| FeedId | Text |
| CreationTime | Timestamp |

Timeslot tables store the alert ids of all users associated with a delivery time slot. Each 15 minute delivery time slot during the day corresponds to one Timeslot table. For example, a table TimeSlot_9_45 includes all alert ids that have delivery preferences set to 9:45 am. At the start of each delivery slot, a number of processes begin processing the alert ids in a TimeSlot table. To coordinate these processes, a 'ClaimedBy' field in the TimeSlot table allows each process to check whether another process is already working on a specific alert id. If the ClaimedBy field is empty, this alert id is available to be processed by the next available process. A sample TimeSlot table data structure is shown in Table 4.

TABLE 4

Sample TimeSlot Table Data Structure

| Data Field | Data Type |
| --- | --- |
| AlertId | Text |
| QosLevel | Int |
| Dst | Int |
| ClaimedBy | Int |

While alerts are in storage, the delivery storage server will also get updates from the user database, at an operation 232. One reason for this is to remove user entries whenever a user deletes an alert or whenever a user decides to change the delivery time of a scheduled alert. At predefined delivery periods, such as every hour, the storage servers access those stored alerts that are to be delivered at that period, and mark those stored alerts for immediate delivery. The storage servers then send those marked alerts to the delivery servers at an operation 234. At an operation 236, the delivery servers apply a template to format the outgoing alerts according to the pre-selected delivery method if the template was not previously applied. The delivery servers then communicate the immediate delivery alerts to the transmission servers for delivery via email, instant message, SMS, and/or whichever delivery method(s) are associated with each alert.

Once an alert has been sent out by a delivery server, an "addToHistory" request is sent to the storage servers, at an operation 238, to update the user's history with the fact that an alert has been sent out. The "addToHistory" request also comprises a set of key-value pairs, so that different alert types can store different sets of information. Once again, the delivery server generally has no knowledge of the specific alert for which it is sending the "addToHistory" request. The set of key-value pairs that need to be stored are defined by the matching side. Every request to the delivery server should also be accompanied by any set of key names that need to be stored for the specific alert.

The history information can also be broadcast from the storage servers to other services. For example, history results can be served to front end Web pages and/or other Web Portal pages, either directly from a mirrored set of storage servers, or from a separate set of storage servers that serve history results. A shared memory can hold as many users' history results as possible (updated live as "addToHistory" requests come in from the delivery servers), and at the same time history results can be written to disk for permanent storage. If a user's top N history results are not in shared memory, the history results can be accessed from the user's permanent storage file. As indicate above, the results will be returned in key-value pairs, and it will be up to the receiving side to format the results in manner that is appropriate to the receiving side. For example, an actual news alert might have been sent to a user with a URL and an abstract of the last 3 news alerts that the user has received, whereas a history page might only need to present the URL. Independent formatting enables new alert types to be added without altering what is stored in the history files, thereby accommodating a new alert type with new requirements for history reporting. In general, the key-value approach will fit future needs.

A number of measures are employed to ensure that information is not lost in an event of a catastrophic failure, a corruption problem, or even a need to upgrade the servers. As indicated above, each storage server is mirrored at least by one other server, so that a server can be taken down while its mirror(s) handle the traffic. Backups of the shared memory and replication files can be employed. For example, at least twice daily backups of the shared memory can be employed, as well as at least 24 hours worth of incoming replication volume files, enable recreation of the shared memory as fast as possible to bring a server back online.

Other recovery capabilities ensure complete processing of delivery requests. For instance, a deliver server marks an alert as "done" only when all user IDs associated with the corresponding content document have been processed. The monitor and/or other utilities can monitor the state of unsent alerts and have alert processing repeated if necessary. This recovery capability can also be applied to the transmission servers.

In addition to ensuring recovery, mirror sets can be used for scalability. To handle increased traffic from the match servers, any number of additional delivery servers can be added at any time. Conversely, any delivery server can be taken offline at any time for any maintenance reason. The remaining live servers will handle the incoming traffic from the match servers.

To handle increased user registration, any number of storage servers can be added horizontally, wherein more total mirror sets are added. To handle increased scheduled alert activity, storage servers can also be added vertically, wherein more mirror servers are added per set.

Illustrative Server Environment

Figure 7:
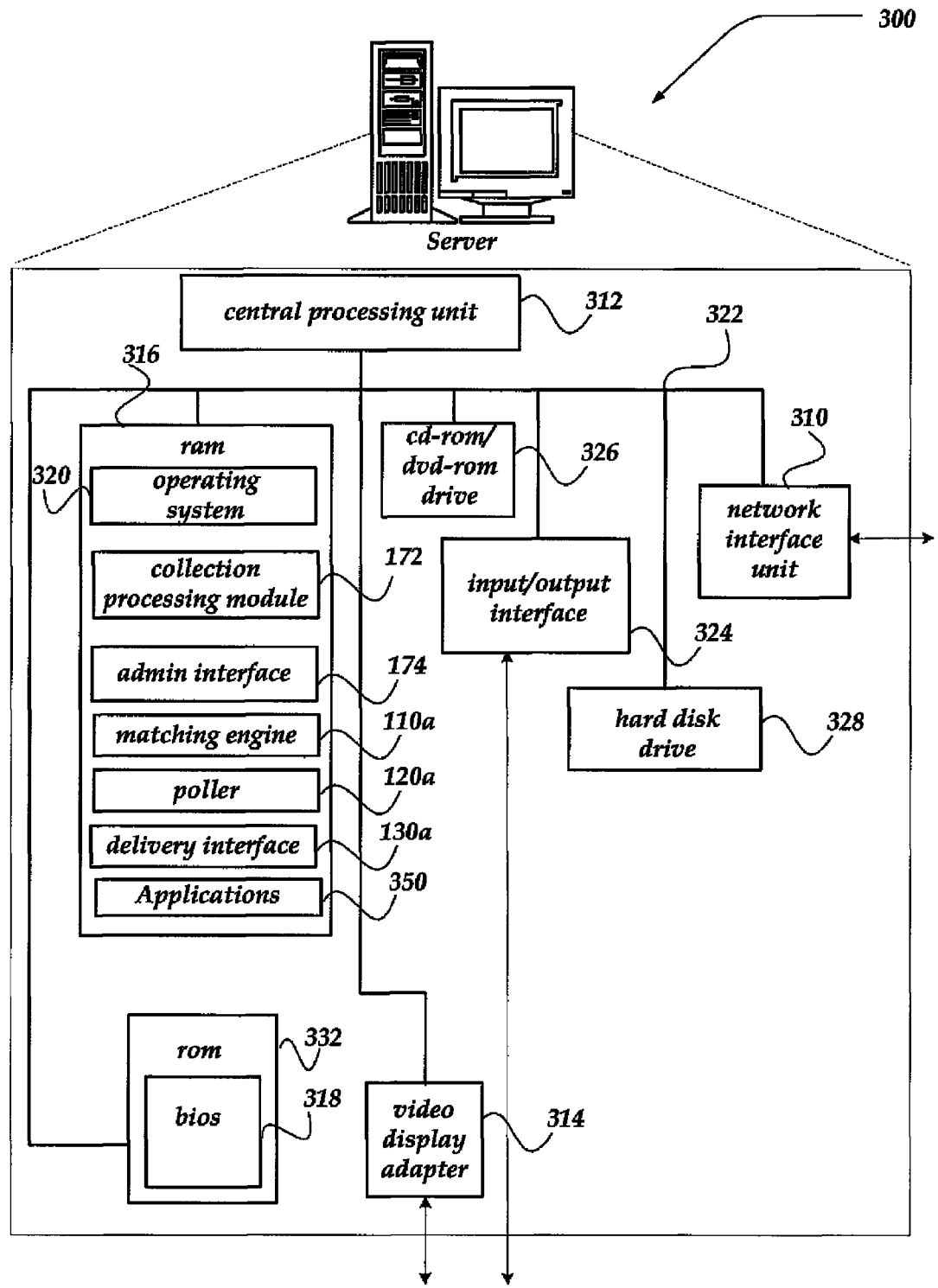
FIG. 7 shows a functional block diagram of an exemplary server according to one embodiment of the invention.

FIG. 7 shows a functional block diagram of an exemplary server 300, according to one embodiment of the invention. Server 300 can comprise any one or more of the servers discussed above, such as the matching servers, the feed storage servers, the poller, the delivery servers, the storage servers, the transmission servers, and the like. Client devices can be similarly configured. Server 300 may include many more components than those shown. The components shown, however, are sufficient to disclose an illustrative embodiment for practicing the invention.

Server 300 includes a processing unit 312, a video display adapter 314, and a mass memory, all in communication with each other via a bus 322. The mass memory generally includes RAM 316, ROM 332, and one or more permanent mass storage devices, such as an optical drive 326, a hard disk drive 328, a tape drive, and/or a floppy disk drive. The mass memory stores an operating system 320 for controlling the operation of server 300. Any general-purpose operating system may be employed. A basic input/output system ("BIOS") 318 is also provided for controlling low-level operation of server 300. As illustrated in FIG. 6, server 300 can communicate with the Internet, or some other communications network, such as network 160 of FIG. 1, via a network interface unit 310, which is constructed for use with various communication protocols including transmission control protocol/Internet protocol (TCP/IP). Network interface unit 310 is sometimes known as a transceiver, transceiving device, network interface card (NIC), and the like. Server 300 also includes input/output interface 324 for communicating with external devices, such as a mouse, keyboard, scanner, or other input devices not shown in FIG. 1.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computing device.

The mass memory also stores program code and data. One or more applications 350 are loaded into mass memory and run on operating system 320. Examples of application programs include database programs, schedulers, transcoders, email programs, calendars, web services, word processing programs, spreadsheet programs, and so forth. Mass storage may further include applications such as collection processing module 172, admin interface 174, matching engine 110a, poller 120a, delivery interface 130a, and the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer implemented method for data collection, comprising:

automatically determining at a predefined period, and based at least in part on a wakeup signal from one of a plurality of poller services, that the one of the plurality of poller services is available to perform work, wherein each poller service manages requests for content for one of a plurality of predefined alert types on behalf of at least one user who requested an alert message of the one of the plurality of predefined alert types;

instructing the one of the plurality of poller services to access validated content from an authenticated source that corresponds to the one of the plurality of predefined alert types, wherein the validated content comprises at least one portion to be provided in at least one alert message to the at least one user, and wherein the validated content comprises content that was verified as received correctly from the authenticated source;

determining whether a previous alert message was generated based on previous content, but was not delivered to the at least one user;

instructing the one of the plurality of poller services to generate the at least one alert message based on the validated content; and updating a task list upon receiving an indication that the one of the plurality of poller services has generated the at least one alert message for delivery to the at least one user.

2. The method of claim 1, further comprising authenticating a source for content and validating content for data collection to obtain the validated content.

3. The method of claim 1, wherein determining is performed by a secondary poller manager after the one of the plurality of poller services attempted to notify a primary poller manager that the one of the plurality of poller services is available for work.

4. The method of claim 1, further comprising determining which of the at least one user has selected to receive the at least one alert message corresponding to the validated content.

5. The method of claim 1, further comprising at least one of:
adding the one of the plurality of poller services to a list of available poller services; and
selecting the one of the plurality of poller services from the list when another one of the plurality of poller services is busy.

6. The method of claim 1, further comprising:
assigning the validated content a quality of service level; and
determining, based on the quality of service level, when the validated content will be used to generate the at least one alert message.

7. The method of claim 1, further comprising at least one of:
updating the alert message based on a difference between the validated content and the previous content; and
generating the alert message based on the difference between the validated content and the previous content.

8. The method of claim 1, wherein the validated content is accessed based on a query expression corresponding to the predefined selection of the at least one user.

9. The method of claim 8, wherein the query expression is accessed from a user profile of the at least one user.

10. The method of claim 9, further comprising:
determining that the validated content is inadequate; and
revising the query to access alternate content.

11. The method of claim 1, further comprising:
accessing additional content if the at least one alert message was not generated within a predetermined period of time; and
considering both the validated content and the additional content to determine when to generate the at least one alert message.

12. The method of claim 1, further comprising:
determining a time at which the validated content is accessed;
determining a period during which the validated content is not used to generate the at least one alert message; and
determining that an additional poller service is needed if the period exceeds a predefined threshold period.

13. The method of claim 1, further comprising throttling notifications that the plurality of poller servers are available for work.

14. A system for data collection, comprising:
a processor;
a communication interface in communication with the processor and in communication with an authenticated content source; and
a memory in communication with the processor and storing data and machine instructions that cause the processor to perform a plurality of operations, including:
automatically determining at a predefined period, and based at least in part on a wakeup signal from one of a plurality of poller services, that the one of the plurality of poller services is available to perform work, wherein each poller service manages requests for content of one of a plurality of predefined alert types on behalf of at least one user who requested an alert message of the one of the plurality of predefined alert types;
instructing the one of the plurality of poller services to access validated content from an authenticated source that corresponds to the one of the plurality of predefined alert types, wherein the validated content comprises at least one portion to be provided in at least one alert message to the at least one user, and wherein the validated content comprises content that was verified as received correctly from the authenticated source;
determining whether a previous alert message was generated based on previous content, but was not delivered to the at least one user;
instructing the one of the plurality of poller services to generate the at least one alert message based on the validated content; and
updating a task list upon receiving an indication that the one of the plurality of poller services has generated the at least one alert message for delivery to the at least one user.

15. The system of claim 14, wherein the machine instructions flier cause the processor to perform the operation of authenticating a source for content and validating content for data collection to obtain the validated content.

16. The system of claim 14, wherein the machine instructions further cause the processor to perform the operation of determining which of the at least one user has selected to receive the at least one alert message corresponding to the validated content.

17. The system of claim 14, wherein the machine instructions further cause the processor to perform the operations of:
assigning the validated content a quality of service level; and
determining, based on the quality of service level, when the validated content will be used to generate the at least one alert message.

18. The system of claim 14, wherein the machine instructions further cause the processor to perform the operations of:
updating the alert message based on a difference between the validated content and the previous content; and
generating the alert message based on the difference between the validated content and the previous content.

19. The system of claim 14, wherein the machine instructions further cause the processor to perform the operations of:
accessing the validated content based on a query expression corresponding to the predefined selection of the at least one user;
determining that the validated content is inadequate; and
revising the query to access alternate content.

20. The system of claim 14, further comprising a mobile client device for receiving the at least one alert message.

21. A computer-readable storage medium for making an alert message accessible, the computer-readable storage medium comprising instructions that enable a computing device to perform the actions of:
automatically determining at a predefined period, and based at least in part on a wakeup signal from one of a plurality of poller services, that the one of the plurality of poller services is available to perform work, wherein each poller service manages requests for content of one of a plurality of predefined alert types on behalf of at least one user who requested an alert message of the one of the plurality of predefined alert types;

instructing the one of the plurality of poller services to access validated content from an authenticated source that corresponds to the one of the plurality of predefined alert types, wherein the validated content comprises at least one portion to be provided in at least one alert message to the at least one user, and wherein the validated content comprises content that was verified as received correctly from the authenticated source;

determining whether a previous alert message was generated based on previous content, but was not delivered to the at least one user;

instructing the one of the plurality of poller services to generate the at least one alert message based on the validated content; and updating a task list upon receiving an indication that the one of the plurality of poller services has generated the at least one alert message for delivery to the at least one user.

22. A system for data collection, comprising:

a computing device;

a plurality of poller services with access to validated content, wherein the validated content comprises content that was verified as received correctly from an authenticated source, and wherein each poller service manages requests for content for one of a plurality of predefined alert types on behalf of at least one user who requested an alert message of the one of the plurality of predefined alert types; and a poller manager in communication with the plurality of poller services, the poller manager performing a plurality of operations, including:

receiving from one of the plurality of poller services, an indication at a predefined period, and based at least in part on a wakeup signal, that the one of the plurality of poller services is available for work;

instructing the one of the plurality of poller services to access validated content corresponding to the one of the plurality of predefined alert types, wherein the validated content comprises at least one portion to be provided in at least one alert message to the at least one user;

determining whether a previous alert message was generated based on previous content, but was not delivered to the at least one user;

instructing the one of the plurality of poller services to generate the least one alert message based on the validated content; and updating a task list upon receiving an indication that the one of the plurality of poller services has generated the at least one alert message for delivery to the at least one user.

23. The system of claim 22, further comprising a secondary poller manager in communication with the poller manager and receiving the indication after the poller manager fails to respond to receiving the indication.

24. The system of claim 22, further comprising an added one of the plurality of poller services in communication with the poller manager, the added one accessing additional content.

25. The system of claim 20, wherein the poller manager further performs the operation of determining which of the at least one user has selected to receive the at least one alert message corresponding to the validated content.

* * * * *